Aug. 22, 1939.   L. HERBER   2,170,685
BUTTER CUTTING MACHINE
Filed Aug. 28, 1937   3 Sheets-Sheet 1

Inventor
LEONARD HERBER
By Chas. C. Reif
Attorney

Aug. 22, 1939.   L. HERBER   2,170,685
BUTTER CUTTING MACHINE
Filed Aug. 28, 1937   3 Sheets-Sheet 2

Inventor
LEONARD HERBER
By Chas. C. Reif
Attorney

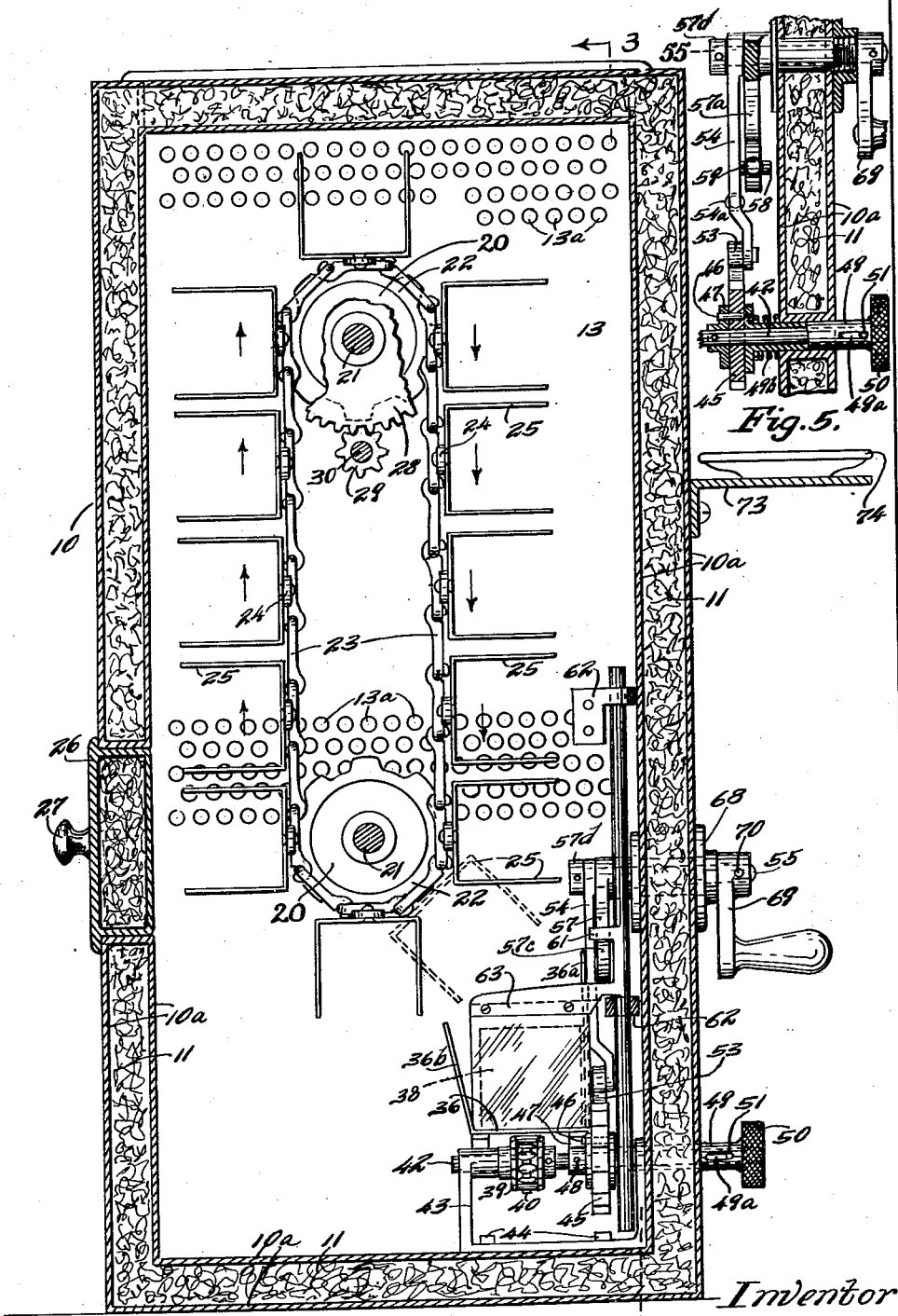

Patented Aug. 22, 1939

2,170,685

UNITED STATES PATENT OFFICE 2,170,685

BUTTER CUTTING MACHINE

Leonard Herber, Rochester, Minn.

Application August 28, 1937, Serial No. 161,451

5 Claims. (Cl. 31—30)

This invention relates to a butter cutting machine and particularly to a machine constructed and arranged to cut small pieces of butter which are commonly used in serving. Such pieces are commonly though not necessarily, of rectangular form in plan and substantially from one-quarter to three-eighths of an inch in thickness.

It is an object of this invention to provide a device in which the butter may be kept cool and clean and which comprises a simple and efficient mechanism for cutting the serving slices of butter and delivering the same.

It is a further object of the invention to provide a butter cutting device comprising a refrigerated cabinet and carrier preferably of the endless type constructed and arranged to carry a plurality of elongated pieces of butter and to discharge the same singularly together with means for feeding and slicing said piece of butter.

It is still another object of the invention to provide a butter cutting device comprising a refrigerated cabinet having means in which the butter may be placed and having means disposed at the outside of the cabinet for actuating devices to discharge feed and cut the butter into serving slices or chips.

These and other objects and advantages of the invention will be fully set forth in the following description made in connection with the accompanying drawings in which like reference characters refer to similar parts throughout the several views and in which:

Fig. 4 is a vertical section taken substantially on line 4—4 of Fig. 3 as indicated by the arrows; and Fig. 5 is a partial section taken substantially on line 5—5 of Fig. 3.

Figure 2:
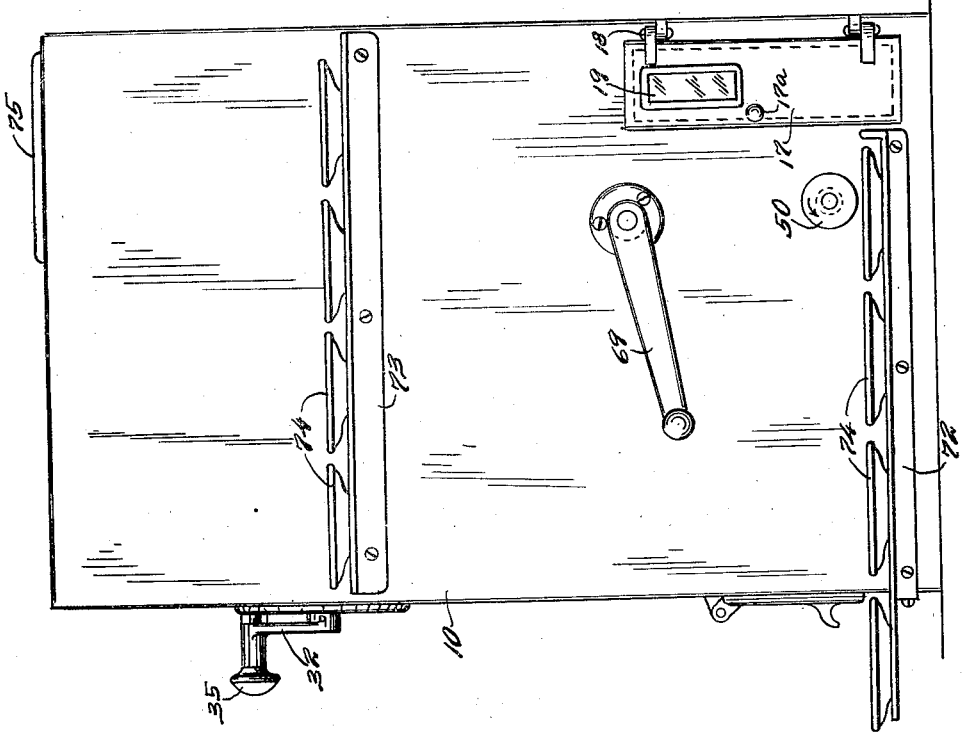
Fig. 2 is a view in side elevation of the device.
Figure 1:
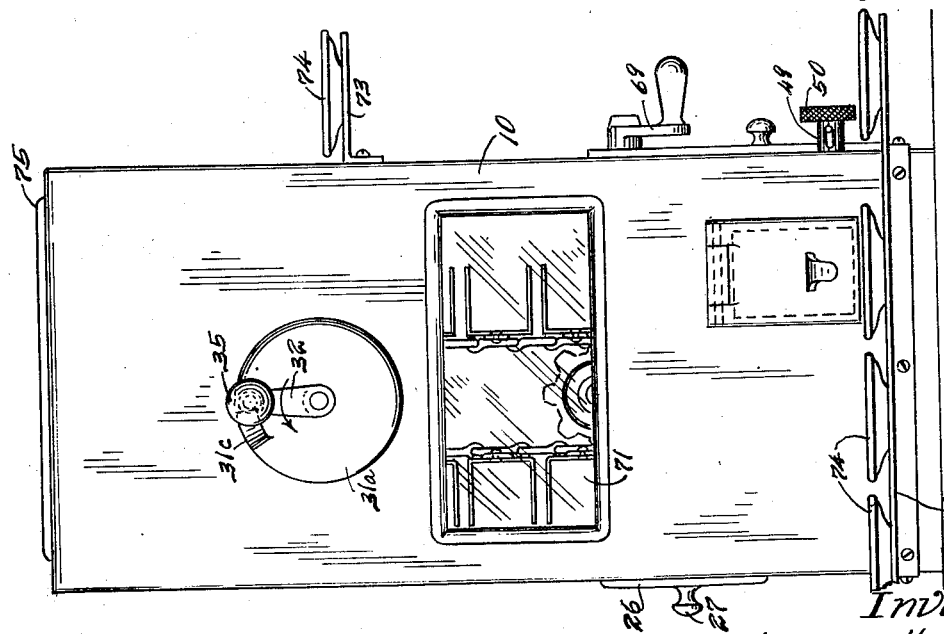
Fig. 1 is a view in front elevation of the device.

Referring to the drawings a device is shown comprising a cabinet or casing 10. While this cabinet might be of various forms, in the embodiment of the invention illustrated, it is shown as substantially rectangular in horizontal and vertical cross section. Said cabinet has spaced walls 10a between which is disposed some suitable heat insulating material 11 such as cork. At one side of said cabinet a chamber or container 12 is provided adapted to receive some refrigerating material such as chopped ice, said chamber having a wall 13 at one side having therein a multiplicity of small holes 13a. The wall or partition 13 extends between the walls 10a and has a bottom formed by a plate 14. Plate 14 has a portion 14a sloping toward its lowermost part which part is provided with a plurality of holes 14b. Portion 14a extends slightly beyond the lower portion of partition 13 and extends upwardly at the outer side thereof for a short distance so as to form a drain means for any moisture which might pass to the outer side of the partition 13 through the holes 13a. A partition 15 extends vertically from plate 14 to the bottom of the casing and forms a compartment in which is disposed a drain tank or vessel 16. The vessel 16 may be removed for emptying through a door 17 disposed at the outer side of the casing and hinged thereto by the hinges 18. Said door is provided with a handle 17a and has a window 19 formed therein so that it can be seen when vessel 16 is nearly full of water. Bearings 20 are secured to one of the walls 10a and to partition 13 at the upper portion of casing 10 and a similar pair of bearings is secured to said parts somewhat lower in casing 10. Said pairs of bearings have bored hubs in coaxial alignment and receive therein the ends of shafts 21 respectively. Shafts 21 have secured thereto in spaced relation sprockets 22. Endless chains 23 run over the sprockets 22 and certain links of said chains have secured thereto plates 24. The plates 24 carry small holders or compartments 25. These holders 25 are shown as having top and bottom walls with free outer edges extending at right angles from a rear wall so that the holder forms an open-sided casing. The plates 24 will preferably be secured to the links of the chains by some readily separable or removable fastening means. Each of the holders 25 is adapted to receive an elongated piece of butter and this may be one of the usual quarter pounds of butter now commonly used. Casing 10 is provided at one side with a removable section or door 26 having one or more knobs 27 thereon through which the holders 25 may be loaded or through which said holders may be removed when detached. The upper shaft 21 has secured thereto a gear 28 formed to partly surround one of the bearings 12 and a pinion 29 meshes said gear. Pinion 29 is secured to a shaft 30 journaled in a bearing 31 extending through the casing wall and having a flange 31a at the outer side of said wall. Shaft 30 has secured thereto a crank 32 having a hollow cylindrical handle portion 32a in which is disposed a coiled compression spring 33. Spring 33 engages the end of portion 32a at one end and at its other end engages a collar 34a formed on a shaft or plunger 34 having an end portion 34b adapted to seat in a hole or recess 31b formed in flange 31. Flange 31 also has a stop forming lug or thickened portion 31c at one side of the hole 31b. Plunger 34 has a knob 35 secured to its outer end by means of which it can be pulled outwardly against the tension of spring 33 to withdraw portion 34b from the hole 31b so that crank 32 may be rotated and shaft 30 and pinion 29 rotated.

A receptacle 36, having a vertical side portion 36a and an outwardly inclined side portion 36b, is disposed below and at one side of the carrier formed by chains 23 and compartments 25, and is adapted to receive a piece of butter 38 from a compartment 25 as said compartment moves into the bottom position on the chains 23. The piece of butter 38 will be discharged from the compartment when the same is approximately in the position indicated by dotted lines in Fig. 4. A pusher member 37 is secured to an endless chain 39 travelling over sprockets 40 secured respectively to shafts 41 and 42. Shafts 41 and 42 are journaled respectively in bearings 43 supported in spaced relation upon the bottom of casing 10 and secured thereto by the bolts 44. A ratchet wheel 45 is loosely mounted on shaft 42 but is connected by a pin 46 to a plate 47 secured to said shaft 42 by a pin 48. Ratchet wheel 45 has secured thereto a sleeve 49 extending through the wall of the casing and having a knurled knob or wheel 50 at its outer end. Sleeve 49 is provided with a slot 49a extending longitudinally thereof in which is disposed a pin 51 secured in shaft 42. A spring 49b engages wall 10a and sleeve 49 and tends to move the latter and ratchet wheel 45 to engage pin 46 in member 47. With this construction knob 50 may be pulled outwardly to move ratchet wheel 45 laterally and withdraw pin 46 from the plate 47 after which shaft 42 may be turned by turning the knob 50. Member 37 in its initial position engages a stop member 37a secured to partition 15. Ratchet wheel 45 is engaged by a stop pawl 52 extending upwardly from and secured to the bottom of casing 10. The ratchet wheel is also engaged and rotated by a spring-pressed pawl 53 pivoted at its end to one end of a lever 54 which lever is pivoted at its upper end to a shaft or stud 55 mounted in bracket 56 secured to partition 15. A coiled tensile spring 54a is secured at one end to lever 54 and at its other end to partition 15 and acts to move said lever against the stop in 54b which projects from partition 15. A bell crank lever 57 is secured to stud 55 and has an arm 57a having an arcuate slot 57b therein into which projects a pin 58 secured to the lever 54. A coiled tensile spring 59 is secured at one end to arm 57a and at its other end to a rod 60 having a downturned end and secured at its other end in bracket 56. A collar 57d is pinned to one end of shaft 55 overlying lever 54. The other or long arm of lever 57 has a rounded portion 57c disposed between lugs 61 secured to a vertical rod 62 which is guided for vertical movement in brackets 62a secured to an inner wall 10a of casing 10. A knife 63 is secured to rod 62. Knife 63 has a wedge shaped edge with one side vertical and one side extending upwardly and outwardly from its lower end. Said knife is constructed and arranged to cut a slice from the piece of butter 38 and said inclined side deflects the cut piece of butter outwardly so that it drops onto a discharge chute 64 extending through the wall 10a of the casing. The chute is closed at its outer side by a door 65 pivoted at its upper end on the hinge pintle 66. Door 65 has a downwardly curved handle 67 thereon. Shaft 55 extends through a wall 10a and through a bearing 68 at the outer side thereof and has secured thereto by a pin 70 a crank 69.

The casing 10 has a window 71 fixed in one side thereof which preferably will have a double glass. Casing 10 also has shelves 72 thereon adjacent its bottom adapted to receive small trays or serving dishes for receiving the pieces of butter. Another shelf 73 is secured to the casing adjacent its top also adapted to receive the dishes or trays 74. A cover 75 is provided for receptacle 12, the same forming a removable section of the casing wall and having a flange 75a engaging the top of the casing. Cover 75 is provided with a suitable handle 76.

Figure 3:
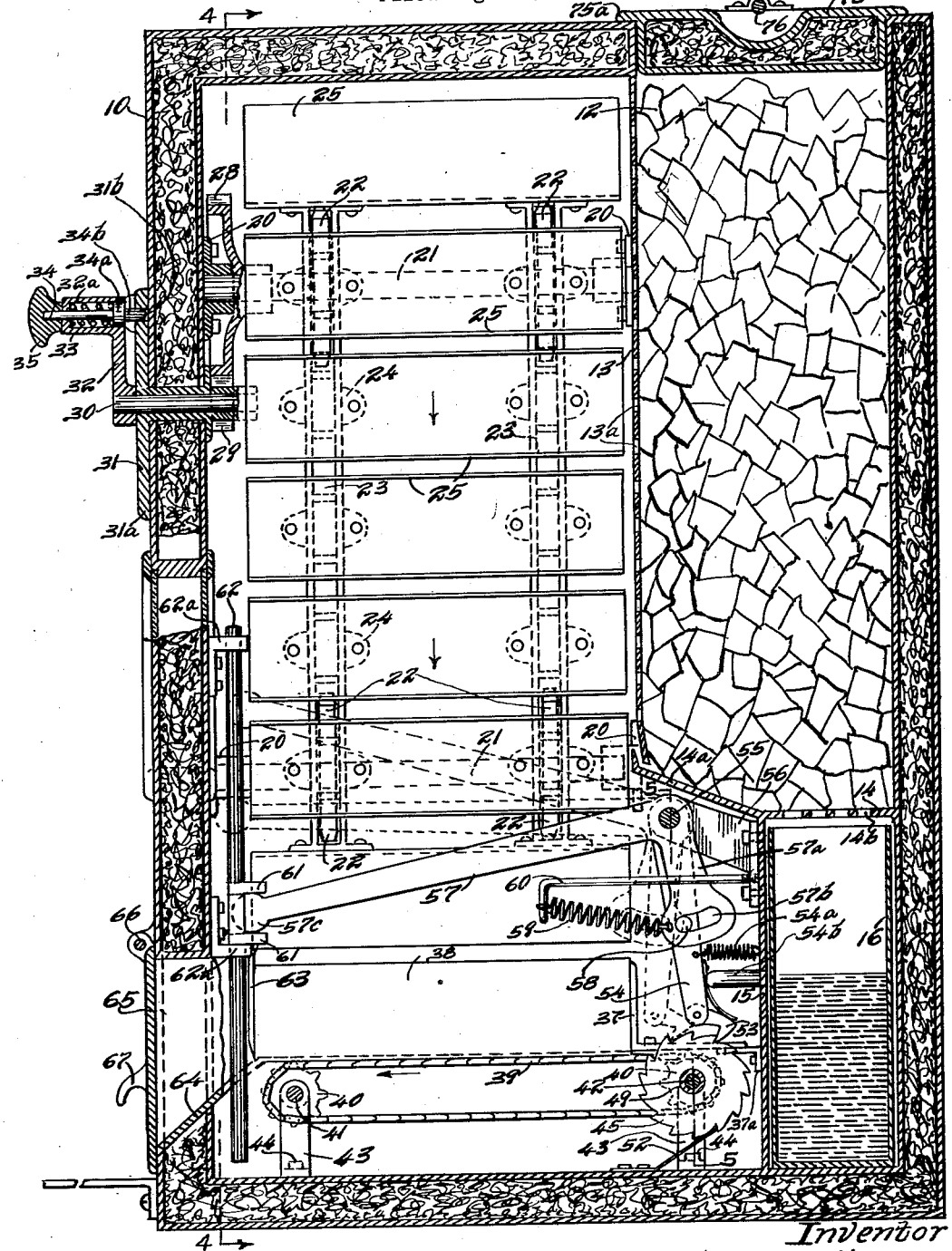
Fig. 3 is a vertical section taken substantially on line 3—3 of Fig. 4 as indicated by the arrows.

In operation, cover 75 will be removed and chopped ice or other suitable refrigerant will be placed in the chamber 12. As the chamber in the casing is well insulated the temperature therein will thus be kept at a low point. The water from the melted ice can pass through the openings 14 into the vessel 16 and as stated, this can be removed when necessary and emptied. The door 26 can be removed and the pieces of butter placed in the compartments 25. The carrier comprising the chains 23 can be intermittently rotated by means of the crank 33 which as above described, turns pinion 29, which in turn rotates the gear 28, the upper shaft 21 and the sprockets 22. The different compartments 25 can thus be successively supplied with the elongated pieces of butter. All but one of the compartments can thus be filled. With the compartments thus loaded, door 26 can be replaced and the machine is then ready for cutting the butter into the desired pieces or slices. As the compartment passes over the receptacle 36 the piece of butter therein will drop into said receptacle. The piece will drop in front of member 37 which will engage one end thereof. The spring 59 swings lever 57 upwardly thus elevating the rod 62 and knife 63. The operator will now depress crank 69 thus swinging stud 55 and depressing the long arm of lever 57 and moving the knife 63 downwardly. A slice of butter will thus be cut from the piece 38 and will be deflected downwardly into the chute 64. The door 65 will at this time be open and the piece of butter will slide out of the chute 64 onto one of the trays or dishes 74 which will be disposed below the said chute. When the operator releases lever 69 spring 59 acts to swing the long arm of lever 57 upwardly thus swinging arm 57a in a clockwise direction as seen in Fig. 3 and when the end of slot 57b engages pin 58 the lever 54 will be swung, thus moving pawl 53 and rotating shaft 42 to move the chain 39. Member 37 will thus be moved forwardly and will push the piece of butter 38 forwardly beneath the knife 63 which at this time is elevated. The operator can now again depress the lever 69 which as described, will move the knife 63 downwardly and cut another slice of butter which will be discharged through chute 64. This operation will be repeated until member 37 comes substantially into vertical alignment with the knife 63 and all of the butter has been cut. At this time the operator will pull outwardly upon the knob 50 and will then turn the same in a clockwise direction. This will rotate shaft 42 and chain 39 will be moved so that member 37 will be moved to the right as shown in Fig. 3 and to its initial position against stop member 37a. After this the operator will pull outwardly upon knob 35 and again turn crank 32 through one rotation. This will move the carrier so that a piece of butter will be discharged from another of the compartments 25 into receptacle 36. The carrier is moved as indicated by the arrows in Figs. 3 and 4. This piece of butter will now be cut up as already described. It will be noted that portion 34b of plunger 34 will enter the hole 31b due to the spring 33 after each rotation of crank 32.

The operations described will be repeated until all of the pieces of butter have been discharged into the receptacle 36 and have been cut into slices. The carrier can then be again loaded as above described. The compartments 25 may be removed from the chain and from the casing 10 through the door 26 when it is necessary to clean them.

From the above description it is seen that applicant has provided a very simple and efficient machine for producing the desired slices of butter. The butter is handled while in a cold and very solid condition when it has little or no tendency to stick to adjacent objects. The butter is kept in clean and sanitary condition and the machine after being loaded is always ready for operation. The cabinet is of convenient form to be placed in a kitchen or cafe where it is to be used and the outer side of the cabinet will be suitably coated or plated. The device will thus have a very attractive appearance. The machine can be easily and quickly operated so that the slices are very rapidly produced. It is obvious that the device will have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:

1. A butter cutting apparatus having in combination, a casing, vertically spaced shafts journaled in said casing, sprockets on said shafts, an endless carrier comprising chains having vertical runs running over said sprockets, a plurality of open sided compartments mounted on said carrier, means for intermittently moving said carrier, a receptacle within said casing having an open upper side and disposed below and at one side of said carrier and spaced therefrom and to which a piece of butter carried in one of said compartments may be discharged in each movement of said carrier as said compartment approaches its lowest position on said carrier, a member longitudinally aligned with said receptacle and engaging one end of said piece for moving it longitudinally in said receptacle, means for intermittently moving said member, a vertically reciprocable knife for cutting a slice from the other end of said piece after each movement of said member and piece and a discharge chute into which said slice falls upon being cut.

2. The structure set forth in claim 1, a chamber within said casing for receiving a refrigerant in said casing and having a vertically extending perforated wall disposed closely adjacent and extending along one end of said carrier, said chamber having a drain means in its bottom and a drain receptacle below said chamber and drain means.

3. The structure set forth in claim 1, said discharge chute extending to the plane in which said knife reciprocates and extending downwardly and outwardly, said knife reciprocating in one plane and having a bevelled edge with the inclined portion directed outwardly so that said knife acts to deflect the slice cut from said piece outwardly into said discharge chute.

4. The structure set forth in claim 1, said compartments having open ends whereby a piece of butter may be placed therein through said end, said casing having an opening aligned with the end of said compartments as they are moved and a door for closing said opening whereby said compartments may be loaded or removed through said door.

5. A butter cutting apparatus having in combination, a casing having spaced walls with an insulating material therebetween, vertically spaced horizontal shafts journalled in said casing, spaced sprockets on each of said shafts, an endless carrier comprising chains having vertical runs running over said sprockets, a plurality of open sided and open ended compartments mounted in spaced relation on said carrier and extending parallel to said shafts each adapted to receive an elongated piece of butter, means comprising a crank disposed at the outer side of said casing for intermittently moving said carrier and compartments, an elongated open topped receptacle in said casing spaced below said carrier and at one side of the center thereof arranged to receive a piece of butter dropping by gravity from one of said compartments as said compartment approaches its lowermost position on said carrier, a member engageable with one end of said piece, a knife for cutting a slice from the other end of said piece, a member at the outer side of said casing for moving said knife downwardly for cutting said slice, means operated by movement of said knife including a ratchet wheel connected to said member for moving the same and moving said piece forwardly under said knife and means operable from the outer side of said casing for disconnecting said ratchet wheel and member and moving said member to initial position in said receptacle.

LEONARD HERBER.